Nov. 4, 1941.    H. T. REEVE    2,261,412
FABRICATION OF DUPLEX METAL BODIES
Filed Oct. 27, 1938
FIG. 1
FIG. 2
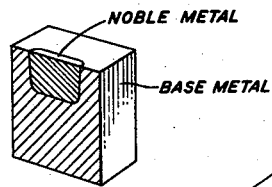
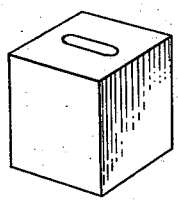
FIG. 3
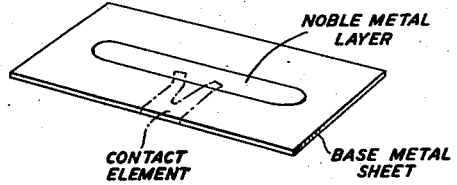
FIG. 4
FIG. 5
FIG. 6
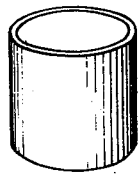
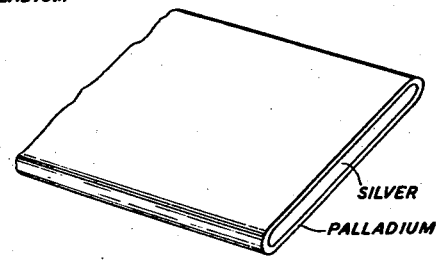
FIG. 7
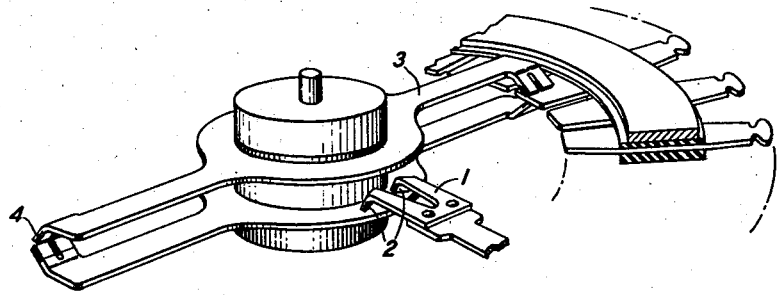
INVENTOR
H. T. REEVE
BY
B. H. Jackson
ATTORNEY Patented Nov. 4, 1941

2,261,412

UNITED STATES PATENT OFFICE 2,261,412

FABRICATION OF DUPLEX METAL BODIES

Howard T. Reeve, Millburn, N. J., assignor to Bell Telephone Laboratories, Incorporated, New York, N. Y., a corporation of New York Application October 27, 1938, Serial No. 237,195

8 Claims. (Cl. 29—155.55)

The present invention relates to duplex metal bodies and to processes of preparing them. More particularly it relates to the formation of duplex metal bodies by uniting a noble metal to a base metal or a noble metal to a noble metal and to the formation of electrical contact elements from said duplex bodies.

Several procedures are available for forming a layer of one metal on a body of another metal. Such duplexed metals are necessary for forming electrical contact points or contact arms where it is desired to obtain the advantages of noble metal contacts without incurring the expense of forming the entire body of noble metal and without incurring the disadvantages resulting from the inherent mechanical softness of most noble metals. Among the procedures of manufacture may be mentioned plating, spraying, painting, and duplexing. Of these methods duplexing gives superior results by far since the thickness of the metal layer can be easily controlled, since the layer is solid and dense as compared to the spongy porous form of deposited metal, and since alloys as well as individual metals may be duplexed, a procedure which is impossible in plating.

It has been impossible satisfactorily to join many metals by duplexing since in many instances a strong and uniform bond will not form directly with the common heating methods. It is often necessary to resort to the use of an intermediate bonding metal, as by soldering or brazing. The use of these low melting joining metals is disadvantageous since the bond is often weak and non-uniform and since the low melting metals tend to penetrate and contaminate the noble metal layer, which is often very thin.

It is an object of the present invention to provide a method of forming duplex metallic bodies with a bond superior to that hitherto obtainable. In some cases metals which previously could not be joined satisfactorily without the use of a solder are given a direct autogenous bond by the method of the present invention. This bond is usually at least as strong as the metals themselves. Consequently, the resulting duplexed material can be rolled into sheets, swaged, drawn into wire or rolled into tape in the same manner as a simple metal body. Further objects will be apparent from the following description and from the drawing in which:

Fig. 1 represents a composite ingot of a base metal having an insect of a noble metal bonded thereto;

Fig. 2 is a sectional view of the same ingot showing the internal arrangement;

Fig. 3 shows a duplex metal sheet prepared by rolling out the ingot of Fig. 1 horizontally, the dotted portion representing the manner in which a contact element may be punched from the metal sheet;

Fig. 4 shows a composite ingot made up of a thin cylindrical container of palladium having an internal body of silver bonded thereto;

Fig. 5 shows a sectional view of the same ingot;

Fig. 6 shows a tape formed by rolling the ingot of Fig. 4 in such a manner that the tape contains an internal core of silver entirely surrounded by a thin layer of palladium; and Fig. 7 shows the punched contact element 1 of Fig. 3, with contact surfaces 2, 2, in place in a step-by-step switch.

The double arm 3 also might be conveniently punched from a base metal sheet having thin layers of contact metal so situated as to produce the necessary contact surfaces, such as the one labeled 4, in proper position.

Broadly the invention is concerned with the bonding of metals by uniformly heating them together to a bonding temperature in an enclosed chamber under substantially inert or non-oxidizing conditions. In carrying out this procedure the metals to be united are placed in an oven or other enclosure in which the desired inert conditions are maintained and are heated to a bonding temperature. The inert or non-oxidizing conditions may be maintained by causing an inert gas such as nitrogen or a reducing gas such as hydrogen to be present in or to sweep through the oven. However, preferably the inert atmosphere is formed simply by producing a high vacuum in the oven. This vacuum is desirably of the order of 1 millimeter or less of mercury absolute pressure, although possibly a higher pressure, for instance up to 5 millimeters or more, may be employed. The advantages of the vacuum diminish rapidly as the pressure is raised above about 1 millimeter.

Both the inert gas and the vacuum function to prevent oxidation, which is normally a serious impediment to the formation of a satisfactory autogenous bond. However, a vacuum is far superior to an inert gas both in certainty of operation and in results obtained. One advantage of the vacuum is that it eliminates the difficulties due to occluded gases which are present in certain metals. For instance, silver which has not been cast in vacuum contains considerable occluded oxygen. If this silver is heated to a fusing temperature in an atmosphere of hydrogen, the hydrogen combines with the oxygen forming bubbles or blisters of water vapor. Thus the silver is not only in a less desirable form, but is also less securely bonded to the other metal than would be the case with vacuum heating. Even with metals which present no difficulty due to occluded gases the vacuum produces a bond superior to that produced by heating in an inert gas. Another advantage of the vacuum is that the small amount of residual oxidizing gas in the apparatus can be controlled by first sweeping out the air with a desired inert gas.

This bonding procedure is broadly applicable to the joining of a noble metal or noble metal alloy to a base metal or base metal alloy. As examples of noble metals may be mentioned silver, gold and gold alloys of various carats, palladium, platinum-rhodium, platinum-iridium, palladium-silver, palladium-copper and silver-tin, which may be joined to base metals such as iron, brass, bronze, nickel, German silver, copper-beryllium, or the magnetic alloys such as permalloy and perminvar. Noble metals may also be joined to noble metals. As an example of this, silver may be joined to palladium.

When the metals to be joined have the proper relationship between their melting points, it is desirable to use an actual fusion method rather than simple welding since a superior bond is obtained in this manner. According to this method a recess is formed in a body of the higher melting metal so as to form a container. This container may consist of a cube having a small recess in one side as shown in Fig. 2 or it may consist of a thin or thick walled hollow cylinder as shown in Fig. 6. Obviously any shape of container or recess may be employed and the relative volumes of container and recess may vary widely. The lower melting metal, which may be in granular or powdered form or in the form of a slug shaped to fit the container is then placed in the recess of the container and the two metals are heated in an enclosed atmosphere of inert gas or vacuum, but preferably under a vacuum, to a temperature above the fusion point of the lower melting metal. After a satisfactory bonding has taken place the body is cooled preferably, but not necessarily, in the inert atmosphere in which it was heated. In this manner, a composite ingot is formed such as shown in Figs. 1, 2, 4 and 5 of the drawing. Reference to these figures will show how the container is formed of one metal and the other metal is fused within it. The container may be of base metal and the fused inset of noble metal, or the container may be of noble metal and the inset of base metal, or both may be of noble metal or both may be of base metal in some instances.

The separate metals of these composite ingots are so well joined that the ingots may be mechanically worked as by rolling, swaging or drawing in the same manner as a single metal. If the ingot of Fig. 1 is rolled horizontally, an inlaid metal sheet such as shown in Fig. 3 is produced. Since the ingot was made up of a large body of base metal with a small inset of noble metal, a base metal sheet is produced with a very thin layer of noble metal situated in the center of one side. The dotted lines in Fig. 3 show the manner in which a contact arm of base metal, faced on one side at one end with a thin layer of noble metal, may be stamped from the sheet.

To produce the ingot of Fig. 4 silver may be fused in a very thin shell of palladium in an enclosed atmosphere of inert gas or vacuum, preferably the latter, at a temperature of about 970° to 980° C. If this ingot is rolled along its vertical axis as shown, a tape as shown in Fig. 6 is produced. This tape consists of a core of silver surrounded by a thin layer of palladium. This is essentially a non-tarnishable silver tape. In place of rolling into a tape, such a composite body may be drawn into a wire consisting essentially of silver surrounded by a very thin layer of palladium. The amount of palladium coating the tape or wire may be so small that the cost of the tape or wire is increased very slightly by its use. Although silver and palladium are mutually soluble in all proportions, some time is required for the fused silver to diffuse into the palladium shell at temperatures not greatly above the melting point of silver. Therefore in the final products the palladium may be substantially uncontaminated with silver, even though the initial shell of palladium may be no more than a few mils thick.

In addition to the non-tarnishing properties imparted to the surface by the protective film of palladium, the surface is made more durable by the very hard layer of silver-palladium alloy in the bond just below the surface film of palladium. This alloy is much harder than either silver or palladium. A palladium coated silver body is therefore made up of a silver core surrounded by a thin layer of hard alloy, the whole being protected against tarnishing by a thin palladium film. Articles of this type have a wide variety of uses. A very thin tape of palladium coated silver may be inlaid in a sheet of base metal, such as brass or bronze, by a simple welding procedure under non-oxidizing conditions to produce a duplex sheet similar to that shown in Fig. 3. Non-tarnishing silver faced contact elements may be stamped from such a sheet.

Silver alloys as well as silver may be protected in this manner. Thus coins may be stamped from coin silver coated in the manner described. The hard alloy layer and the protective palladium layer render the article well adapted for such use. Similarly sterling silver articles may be formed from sterling silver covered with a thin layer of palladium.

Nickel and silver, because of their peculiar solubility relationship, lend themselves very well to the production of contact materials in the manner illustrated by Figs. 1, 2 and 3. In the solid state nickel is almost totally insoluble in silver but silver is soluble in nickel up to about 4 per cent. Therefore, when silver is fused in a nickel shell, the silver penetrates the nickel, thereby forming a very secure bond, but the silver remains uncontaminated with the nickel. In carrying out this procedure granular silver or a close-fitting piece of silver may be placed in a relatively thick walled nickel container and both heated to a temperature of about 970° to 980° C. in an inert atmosphere, which is preferably a vacuum. After cooling, the ingot may be rolled to produce a nickel sheet faced with a thin layer of silver, from which contact elements may be punched if desired. In this manner a contact material may be produced which is faced with a very thin layer of absolutely pure silver. In connection with these two metals it may also be pointed out that it has hitherto been impossible to obtain a satisfactory bond between them without the use of a solder. The very advantage of these two materials in that the nickel does not contaminate the silver is lost by the use of a contaminating solder. If desired, a very thin walled nickel container may be used, in which case the amount of silver will be large as compared to the nickel.

As an example of the use of an alloy in this procedure, a palladium-copper alloy, as for instance one containing 60 per cent palladium and 40 per cent copper, may be fused under non-oxidizing conditions, preferably under a vacuum, in a container of iron or an iron alloy such as permalloy or perminvar. The resulting composite ingot may be rolled into a sheet and contact arms punched therefrom. Such contact elements consist of a base metal or alloy contact arm of a high magnetic permeability faced with a layer of palladium-copper, a very desirable contact metal. These contact arms are useful in magnetically operated relays. The process of the present invention makes possible the production of such a duplex contact material having a very effective bond between the component metals.

Although the metal to be fused has, in the procedure above, been placed in the container in solid form, it is obviously within the scope of the invention first to fuse the metal and then to pour it into the container in an enclosed inert atmosphere heated to the proper temperature.

It can be seen from the specific description given above that the invention is of wide application. Joining metals or solders may be used if desired. According to this procedure a thin foil of one metal may be bonded to another metal by one of the procedures set forth and then the opposite face of the foil may be bonded to a third metal. Copper is a desirable joining metal since its ductility facilitates mechanical working of the composite body. However, it is an advantage of the processes of this invention that an autogenous bond may be directly obtained between the two metals which it is desired to join. Therefore, in general, it is preferable not to use a solder or joining metal.

It is to be understood that the term "metal" as used in the following claims is intended to include alloys as well as individual metals.

What is claimed is:

1. The method of producing base metal contact members faced with a noble metal having a lower melting point than the base metal, which comprises forming a container of the base metal, placing the noble metal within said container, heating under a vacuum to a temperature above the melting point of the noble metal to form an autogenous bond between the two metals, cooling, mechanically working the ingot thus formed to produce a base metal sheet faced with the noble metal and forming contact members from the sheet.

2. The method of producing a pure silver faced contact member which comprises forming a container of a metal in which silver is slightly soluble but which is not soluble in silver, placing the silver within said container and heating under a vacuum until a small amount of silver penetrates the metal container to form an autogenous bond, cooling under vacuum, mechanically working the ingot thus formed to produce a duplex sheet and forming contact members therefrom.

3. The method of producing a nickel sheet faced with pure silver comprising forming a container of nickel, placing silver within said container, heating under non-oxidizing conditions to a temperature above the melting point of the silver to form an autogenous bond, cooling and mechanically working the ingot thus formed to produce a duplex sheet.

4. The method of forming a duplex material which comprises forming a container of palladium, placing silver within said container, heating under non-oxidizing conditions to a temperature above the melting point of the silver to form an autogenous bond, cooling and mechanically working the ingot thus formed to produce an elongated body of silver surrounded by a thin layer of palladium.

5. The method of producing base metal contact members faced with a noble metal having a lower melting point than the base metal which comprises forming a container of the base metal, placing the noble metal within said container, heating at a temperature above the melting point of the noble metal to form an autogenous bond between the two metals, cooling, mechanically working the ingot thus formed to produce a base metal sheet faced with the noble metal and forming contact members from the sheet.

6. The method of producing a silver-faced contact member which comprises forming a container of nickel, placing silver within said container, heating at a temperature above the melting point of silver but below the melting point of nickel to form an autogenous bond between the two metals, cooling, mechanically working the ingot thus formed to produce a duplex sheet and forming contact members therefrom.

7. The method of producing an iron alloy contact member faced with palladium-copper which comprises forming a container of the iron alloy, placing the palladium-copper within said container, heating at a temperature above the melting point of the palladium-copper but below the melting point of the iron alloy to form an autogenous bond, cooling, mechanically working the ingot thus formed to produce a duplex sheet and forming contact members therefrom.

8. The method which comprises heating a metal, predominantly silver, in contact with a palladium body at a temperature above the melting point of the silver metal but below the melting point of palladium for a time sufficient to cause the formation of an autogenous body and cooling the silver metal to solidification in contact with the palladium.

HOWARD T. REEVE.